(12) United States Patent
Gilchrist et al.

(10) Patent No.: US 12,254,786 B2
(45) Date of Patent: Mar. 18, 2025

(54) RECORDED PHYSICAL INTERACTION PLAYBACK

(71) Applicant: The Boeing Company, Chicago, IL (US)

(72) Inventors: Matthew James Gilchrist, Brisbane (AU); Jesse Lee Kresevic, Brisbane (AU); Nathan Cameron Perry, Brisbane (AU); Christopher P. Galea, Brisbane (AU)

(73) Assignee: The Boeing Company, Arlington, VA (US)

( * ) Notice: Subject to any disclaimer, the term of this patent is extended or adjusted under 35 U.S.C. 154(b) by 469 days.

(21) Appl. No.: 17/652,260

(22) Filed: Feb. 23, 2022

(65) Prior Publication Data

US 2023/0267849 A1     Aug. 24, 2023

(51) Int. Cl.
*G09B 9/16*     (2006.01)
*G06T 19/00*    (2011.01)

(52) U.S. Cl.
CPC ............ *G09B 9/165* (2013.01); *G06T 19/006* (2013.01)

(58) Field of Classification Search
CPC ........ G09B 9/02; G09B 9/08; G09B 9/10–38; G09B 9/48
See application file for complete search history.

(56) References Cited

U.S. PATENT DOCUMENTS

| | | | |
|---|---|---|---|
| 2009/0213114 A1* | 8/2009 | Dobbins | G06F 3/011 345/419 |
| 2016/0293037 A1* | 10/2016 | Jacques | G09B 9/02 |
| 2017/0025031 A1 | 1/2017 | Dreyer et al. | |
| 2018/0286269 A1 | 10/2018 | Lechner et al. | |
| 2019/0027055 A1 | 1/2019 | Andersen et al. | |
| 2019/0392639 A1* | 12/2019 | Kitain | G09B 9/302 |
| 2020/0341542 A1* | 10/2020 | Kur | G06F 3/012 |

(Continued)

FOREIGN PATENT DOCUMENTS

| | | |
|---|---|---|
| EP | 3543986 A1 | 9/2019 |
| WO | 2015192195 A1 | 12/2015 |

OTHER PUBLICATIONS

European Patent Office, Extended European Search Report Issued in Application No. 23157828.7, Jul. 18, 2023, Germany, 13 pages.

(Continued)

*Primary Examiner* — Robert J Utama
*Assistant Examiner* — Correll T French
(74) *Attorney, Agent, or Firm* — Alleman Hall & Tuttle LLP

(57) ABSTRACT

A method is described. The method comprises obtaining a recording of one or more physical interactions performed in relation to one or more physical components, in a simulation environment, playing back the recording such that the one or more physical interactions are represented in the simulation environment, and in the simulation environment, detecting a user interaction with one or more physical components of the simulation environment. The method further comprises determining whether the user interaction is congruent with at least one corresponding physical interaction of the one or more physical interactions in the recording, and in response to such congruence, continuing playback of the recording in the simulation environment.

20 Claims, 12 Drawing Sheets

(56) References Cited

U.S. PATENT DOCUMENTS

2021/0264810 A1 8/2021 Johnson et al.
2022/0005374 A1* 1/2022 Leahy ............ H04N 21/234381

OTHER PUBLICATIONS

Inverse kinematics, Wikipedia Website, Available Online at https://en.wikipedia.org/w/index.php?title=Inverse_kinematics&oldid=1072022704, Available as Early as Jun. 16, 2007, 6 pages.

Adams, E., "VR Pilot Training Now Comes With a Sense of Touch," Wired, Available Online at https://www.wired.com/story/pilot-training-simulator-vr-haptic-touch/, Jun. 26, 2018, 6 pages.

Howie, S. et al., "Virtual Observations: a software tool for contextual observation and assessment of user's actions in virtual reality," Virtual Reality, vol. 25, Aug. 19, 2020, 14 pages.

Lopez, T. et al., "A playback tool for reviewing VR experiences," Proceedings of the 23rd ACM Symposium on Virtual Reality Software and Technology, Nov. 8, 2017, Gothenburg, Sweden, 2 pages.

Smith, G., "Liberty's innovative model for remote simulator flight training gains FAA approval," Liberty University, Available Online at https://www.liberty.edu/news/2020/05/21/libertys-innovative-model-for-remote-simulator-flight-training-gains-faa-approval/, May 21, 2020, 5 pages.

* cited by examiner

RECORDED PHYSICAL INTERACTION PLAYBACK

FIELD

This invention relates to the playback of recorded physical interactions, and more specifically to representing recorded physical interactions in a simulation environment through the actuation of physical components and/or display of imagery.

BACKGROUND

A variety of training platforms have been developed for training users to perform various tasks, operate equipment, or for other purposes. Training platforms for teaching prospective pilots to operate aircraft, for example, have been developed that provide a physical simulator in which physical components such as yokes, pedals, rotary dials, and other controls can be manipulated to simulate the experience of operating an aircraft. The physical simulator typically includes a display system that produces imagery representing a virtualized surrounding environment, such that inputs provided by a user of the physical simulator are reflected in the operation of the virtualized aircraft as represented by the imagery output by the display system.

Existing physical simulators, including those designed for training aircraft pilots, pose various drawbacks that can adversely affect training and preclude some types of training altogether. One limitation of physical simulators is that a physical simulator typically requires two pilots to be present in the same training device, with the physical presence of a flight instructor to complete crewed training activities. This places limitations on both the location and time at which training can be conducted, as all parties are required to be present at the same physical location with access to the simulation equipment. Further, typical physical simulators offer limited support for training content, which is typically delivered through audio and/or video presented on a display system. This approach places a burden on a simulator user to interpret instructions from such content, which frequently involves complex and fine motor actions that can be difficult to replicate from audiovisual instruction alone. It is these complex and fine motor actions that are often fundamental to learning aircraft operating procedures, such as yoke manipulations performed in the takeoff or landing of an aircraft, and frequently require accurate reproduction to achieve successfully. Not only does the delivery of training content through audiovisual means fails to match the immersive nature of a physical simulator, such delivery also fails to convey instruction in a tactile or proprioceptive manner and provide feedback as a simulator user attempts to perform actions in accordance with instruction.

In view of the above, challenges exist in representing recorded physical interactions in simulation environments, and representing recorded physical interactions in immersive and proprioceptive manners.

SUMMARY

To address the above issues, according to one aspect of the present disclosure, a method is provided. In this aspect, the method comprises obtaining a recording of one or more physical interactions performed in relation to one or more physical components, in a simulation environment, playing back the recording such that the one or more physical interactions are represented in the simulation environment, and in the simulation environment, detecting a user interaction with one or more physical components of the simulation environment. In this aspect, the method further comprises determining whether the user interaction is congruent with at least one corresponding physical interaction of the one or more physical interactions in the recording, and in response to such congruence, continuing playback of the recording in the simulation environment.

Another aspect of the present disclosure relates to a computing system. In this aspect, the computing system comprises a logic subsystem, and a storage subsystem comprising instructions executable by the logic subsystem to obtain a recording of one or more physical interactions performed in relation to one or more physical components, in a simulation environment, play back the recording such that the one or more physical interactions are represented in the simulation environment, and in the simulation environment, detect a user interaction with one or more physical components of the simulation environment. In this aspect, the storage subsystem further comprises instructions executable by the logic subsystem to determine whether the user interaction is congruent with at least one corresponding physical interaction of the one or more physical interactions in the recording, and in response to such congruence, continue playback of the recording in the simulation environment.

Another aspect of the present disclosure relates to a method. In this aspect, the method comprises obtaining a recording of one or more physical interactions performed in a recording environment in relation to one or more physical components, mapping the recording environment to a simulation environment in which the recording is to be played back, and in the simulation environment, playing back the recording such that the one or more physical interactions are represented in the simulation environment through one or both of displaying a virtual avatar that is animated to represent at least a portion of a human body performing the one or more physical interactions, or for each of the one or more physical components actuating a corresponding physical component in the simulation environment. In this aspect, the method further comprises, in the simulation environment, detecting a user interaction with one or more physical components of the simulation environment, determining whether the user interaction is congruent with at least one corresponding physical interaction of the one or more physical interactions in the recording, and in response to such congruence, continuing playback of the recording in the simulation environment.

The features, functions, and advantages that have been discussed can be achieved independently in various embodiments or can be combined in yet other embodiments, further details of which can be seen with reference to the following description and drawings.

DETAILED DESCRIPTION

Figure 1:
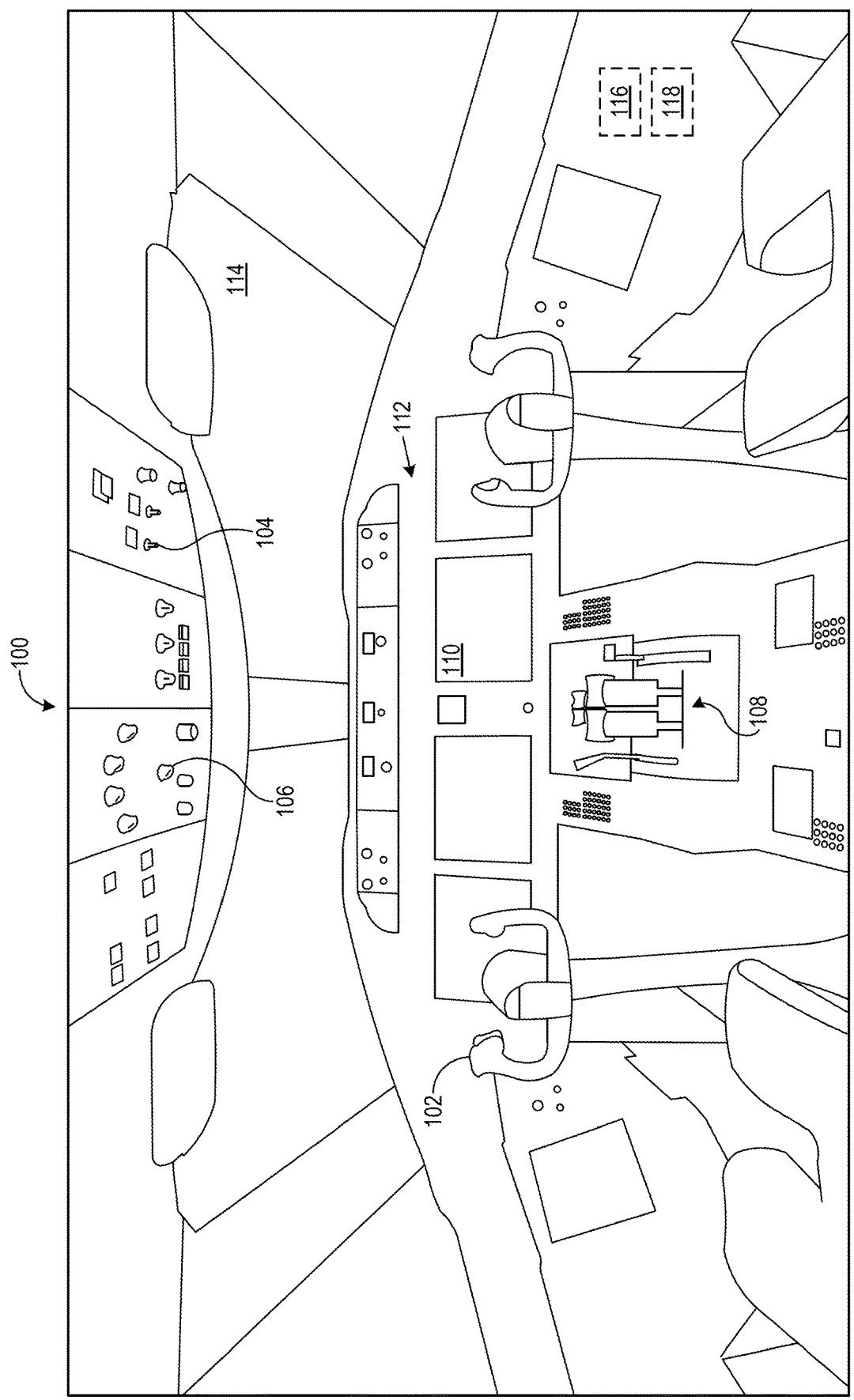
FIG. 1 shows an illustration depicting an example simulation environment that simulates an aircraft cockpit.

In view of the above, systems and methods are provided that relate to the playback of physical interactions recorded in a recording environment so that the recorded physical interactions are represented in a simulation environment. Among other examples, implementations are disclosed in which physical interactions with physical components of an aircraft (e.g., yokes, pedals, dials) are recorded and played back in a simulation environment—e.g., as part of an aircraft training procedure in which users in the simulation environment learn to operate an aircraft through playback of the recorded physical interactions. In some examples, the simulation environment includes a physical simulator having physical components, such that playback of the recorded physical interactions can include actuating physical components in the physical simulator. The actuation of a physical component in the simulation environment can resemble how a corresponding physical component was actuated during recording, for example.

In other examples, the simulation environment provides a virtual representation of physical components, such as in a virtual or augmented reality environment presented on a head-mounted display device. In such examples where the simulation is at least partially virtualized, the playback of recorded physical interactions can include the display of a virtual avatar that is animated to represent a human operator performing the physical interactions that were recorded. Where a real human operator performs physical interactions that are recorded for subsequent playback, motion data describing the operator's physical motions can be collected and used to animate the virtual avatar. When motion data is not available, the virtual avatar can instead be animated to perform a physical interaction using an inverse kinematic solver based on the type of the physical interaction and location(s) at which the interaction occurs. The inverse kinematic solver can also be used to animate virtual avatar interactions for examples in which a recording environment, in which physical interactions are recorded, and a simulation environment, in which the recorded physical interactions are played back, are different. Still further, virtual avatar(s) can be provided that cooperate with a simulator user to achieve multi-user, crewed training scenarios.

The playback of physical interactions as described herein can facilitate immersive training scenarios in which users learn procedures with a three-dimensional and proprioceptive understanding of how physical components are actuated. In examples in which playback includes actuating physical components in the simulator, this immersive, three-dimensional understanding can be supplemented by tactile and/or force feedback to a user, enabling the user to not only see but feel how physical components can be manipulated to achieve a related outcome. This type of tactile and/or proprioceptive understanding can greatly benefit training scenarios where complex and/or fine motor actions are involved, such as actions performed in operating an aircraft. User understanding can be further enhanced through animating a virtual avatar to demonstrate how a human operator can perform a given interaction, which can include correcting an incorrect interaction made by a user. Virtual avatar(s) can also cooperate with a user to enable multi-user, crewed training scenarios without requiring the user to perform interactions assigned to multiple different crew members or the presence of multiple real human operators. Still further, the use of an inverse kinematic solver can enable the virtual avatar to be animated without motion data and/or in scenarios where the environment in which physical interactions are recorded and the environment in which the recording is played back differ.

FIG. 1 depicts an example simulation environment 100 that simulates an aircraft cockpit through the provision of a plurality of physical components found in a typical aircraft cockpit. Such physical components include, but are not limited to, yokes such as yoke 102, switches such as switch 104, rotary dials such as rotary dial 106, and throttle levers 108. These and other potential physical components provided in simulation environment 100 can be actuated or otherwise interacted with by a user of the simulation environment to affect the state of the simulation environment and thus the state of a virtualized aircraft as provided by the simulation environment. The state of the simulation environment/virtualized aircraft can be conveyed to the user of the simulation environment through the state of physical components in the simulation environment and/or through output from one or more displays provided in the simulation environment. For example, the simulation environment can provide a display 110 within an instrument panel 112 in the simulated aircraft cockpit that conveys information regarding the state of the virtualized aircraft. Alternatively or additionally, the simulation environment can provide a display 114 that produces imagery representing a virtualized environment surrounding the virtualized aircraft. Display 114 thus can also convey information regarding the state of the virtualized aircraft by animating the virtualized environment as moving or otherwise changing as the virtualized aircraft undergoes motion. In these ways, simulation environment 100 can provide a mechanism by which users can learn to operate aircraft in an immersive and realistic manner.

Figure 2:
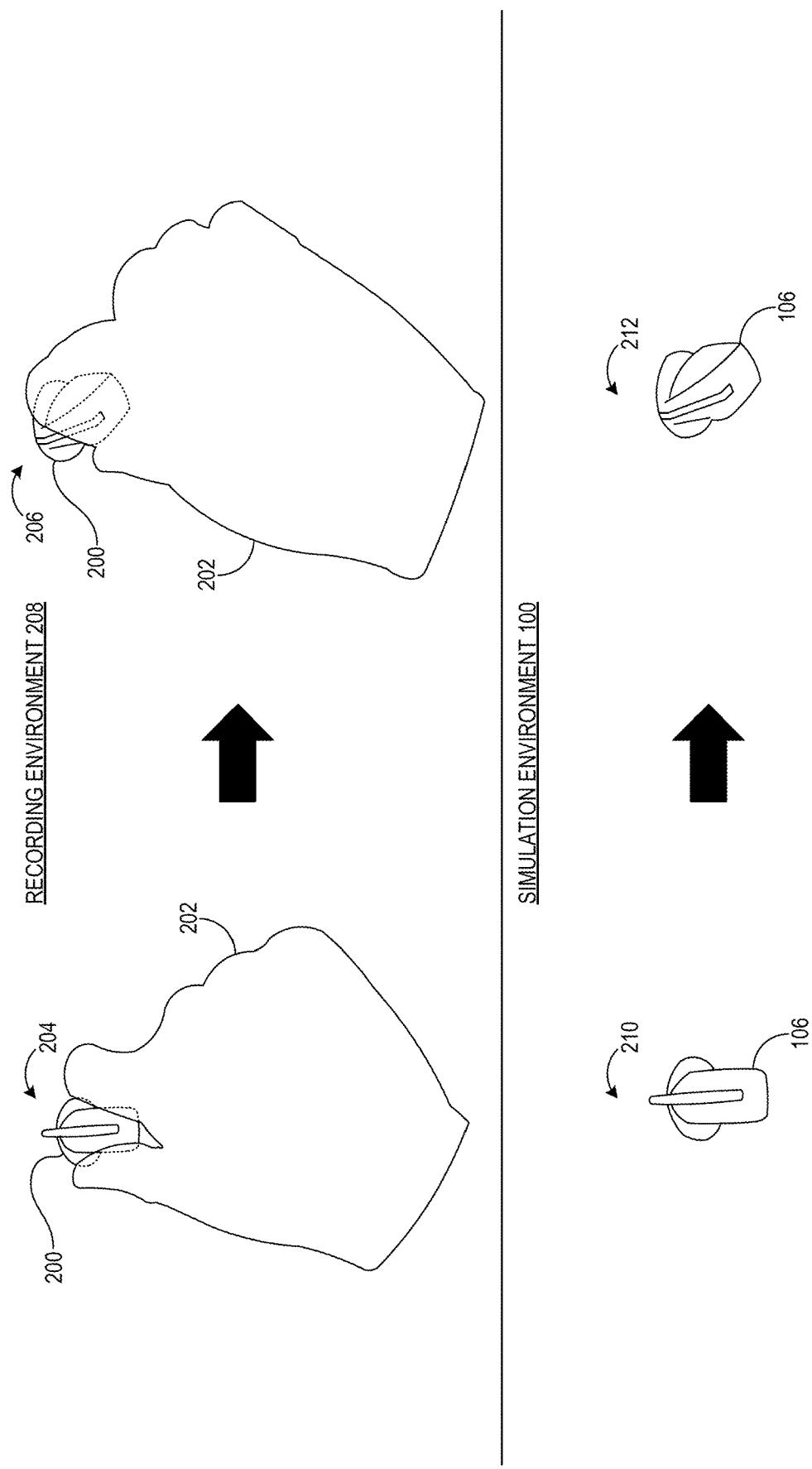
FIG. 2 shows an illustration depicting how an example physical interaction can be recorded and provided for subsequent playback in the simulation environment of FIG. 1.

Simulation environment 100 supports the playback of recorded physical interactions so that the recorded physical interactions are represented in the simulation environment 100. As simulation environment 100 provides a physical simulator with physical components, playback can include actuating one or more physical components in the simulation environment 100 according to the recorded physical interactions. As one example, FIG. 2 illustrates how a physical interaction with a rotary dial 200 can be recorded and provided for subsequent playback in simulation environment 100. In this example, the physical interaction includes the rotation, by a hand 202 of a human operator, of rotary dial 200 from an initial orientation 204 to a final orientation 206. This physical interaction is conducted and recorded in a recording environment 208 occupied by the human operator. As described below, various relationships are possible between a recording environment, in which physical interaction(s) are recorded, and a simulation environment, in which the recorded physical interaction(s) are played back, including but not limited to the environments being the same physical environment, or being related but physically separate environments (e.g., physically separate simulators designed for a common type or model of aircraft). As further described below, examples are possible in which one or both of the recording and simulation environments are at least partially virtualized, which can involve virtualized physical interactions and/or virtualized playback of recorded interactions (e.g., through the display of a virtual avatar).

FIG. 2 depicts how the physical interaction with rotary dial 200 in recording environment 208 can be played back in simulation environment 100. In this example, the recorded physical interaction is played back by actuating rotary dial 106—specifically, by rotating the rotary dial 106 from an initial orientation 210 to a final orientation 212. In some examples, initial orientation 210 and final orientation 212 can be substantially equal to initial orientation 204 and final orientation 206, respectively. Alternatively or additionally, rotary dial 106 can be rotated through substantially the same angle as the angle through which rotary dial 200 was rotated in transitioning from initial orientation 204 to final orientation 206. As described below, the playback of a physical interaction can have any suitable correspondence to the physical interaction as the interaction was recorded, including but not limited to playback exhibiting a substantially equal degree of translation, rotation, rate of change, and/or acceleration as was recorded.

A selection process can be performed to identify rotary dial 106, among other rotary dials and physical components in simulation environment 100, as the physical component for which the physical interaction recorded in recording environment 208 is to be played back. For examples in which recording and simulation environments 208 and 100 are the same physical simulators, the physical component(s) for which interactions are recorded can be selected as the physical component(s) to actuate to thereby play back those interactions. For other examples in which recording and simulation environments 208 and 100 are different physical simulators, or differ in another aspect (e.g., one environment is an at least partially virtualized simulator while the other environment is a physical simulator), mappings can be created between recording environment physical components and simulation environment physical components. This mapping can be performed on any suitable basis. As examples, a physical component in a recording environment can be mapped to a physical component in a simulation environment upon determining that the two physical components perform the same or a like function, are a common type of physical component, and/or correspond in any other suitable way.

Figure 3A:
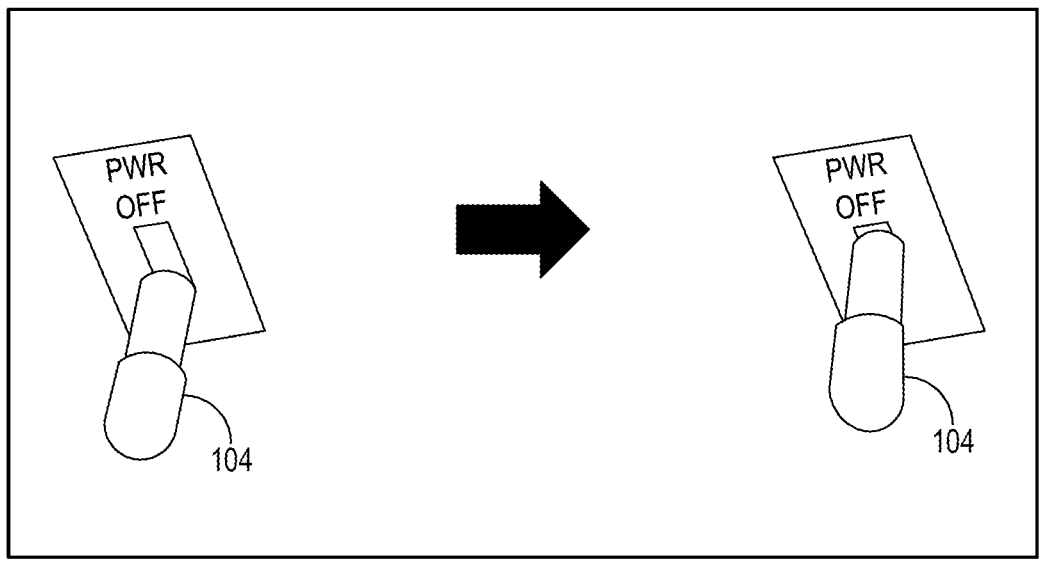
FIGS. 3A-3B show illustrations depicting additional examples of physical component actuation in the simulation environment of FIG. 1.
Figure 3B:
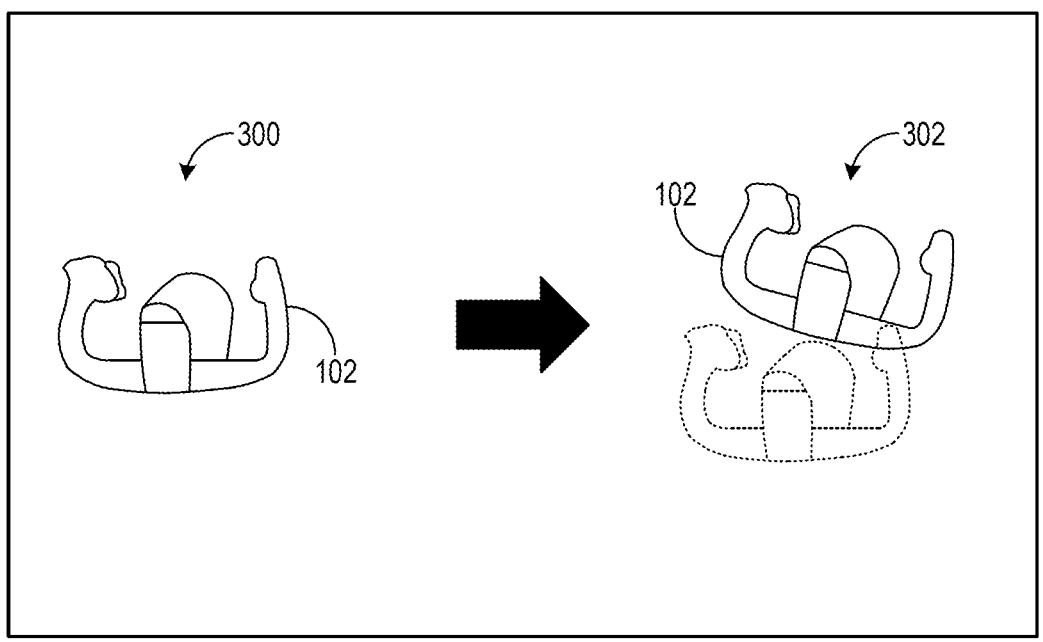

FIGS. 3A-3B depict examples illustrating additional examples of physical component actuation in simulation environment 100. In the example depicted in FIG. 3A, switch 104 is actuated from a power-on state to a power-off state in accordance with a physical interaction that was previously recorded in relation to another physical component—e.g., a switch that can also be actuated between power-on and-off states. In the example depicted in FIG. 3B, yoke 102 is actuated by undergoing translation and rotation from an initial orientation 300 to a final orientation 302 in accordance with a physical interaction that was previously recorded in relation to another physical component, such as a yoke located in a recording environment physically separated from simulation environment 100. The actuation of yoke 102 can correspond to recorded physical interaction in any suitable manner—for example, yoke 102 can be actuated with one or more of substantially the same degree of translation, degree of rotation, velocity, and acceleration as the degree of translation, degree of rotation, velocity, and/or acceleration exhibited in the recording, respectively. As yoke movements typically can be complex and involve subtle and fine motor actions, yet produce significant changes in aircraft operation, actuating yoke 102 by substantially reproducing recorded yoke motion can convey such complexity, etc. in the recording and thereby provide a greater degree of instructive content and feedback to a user of simulation environment 100—e.g., as compared to examples where recorded physical component motion is not reproduced or conveyed in a tactile/three-dimensional/proprioceptive manner, such as in implementations that deliver instructional content through audiovisual means alone.

To achieve physical component actuation in simulation environment 100, the simulation environment 100 can include an actuator system, which is schematically indicated at 116. Actuator system 116 can drive one or more actuators (e.g., motor-driven actuators) coupled to physical components to thereby actuate those physical component(s). Actuator system 116 can utilize any suitable type of actuator, which can depend on the type of physical component being actuated. Actuator examples include but are not limited to linear and rotary actuators. As a particular example, rotary dial 106 can be actuated via a rotary actuator provided by actuator system 116. Further, simulation environment 100 can include a sensor system, which is schematically indicated at 118. Sensor system 118 can employ one or more sensors coupled to one or more physical components to thereby sense actuation of those physical component(s). Any suitable properties of actuation can be sensed, including but not limited to translation, rotation, velocity, and/or acceleration. Sensor system 118 can be used to collect data that forms at least part of a recording of physical interaction, where the collected data can be used in the playback of the recording—for example, a physical component can be actuated according to how the component was actuated in the recording as sensed by sensor system 118. Alternatively or additionally, sensor system 118 can be used to detect the congruence of how a physical component is actuated during recording playback with how a corresponding physical component was actuated in the recording. Such detection can inform a determination as to whether a user of simulation environment 100 performed an action correctly.

Figure 4A:
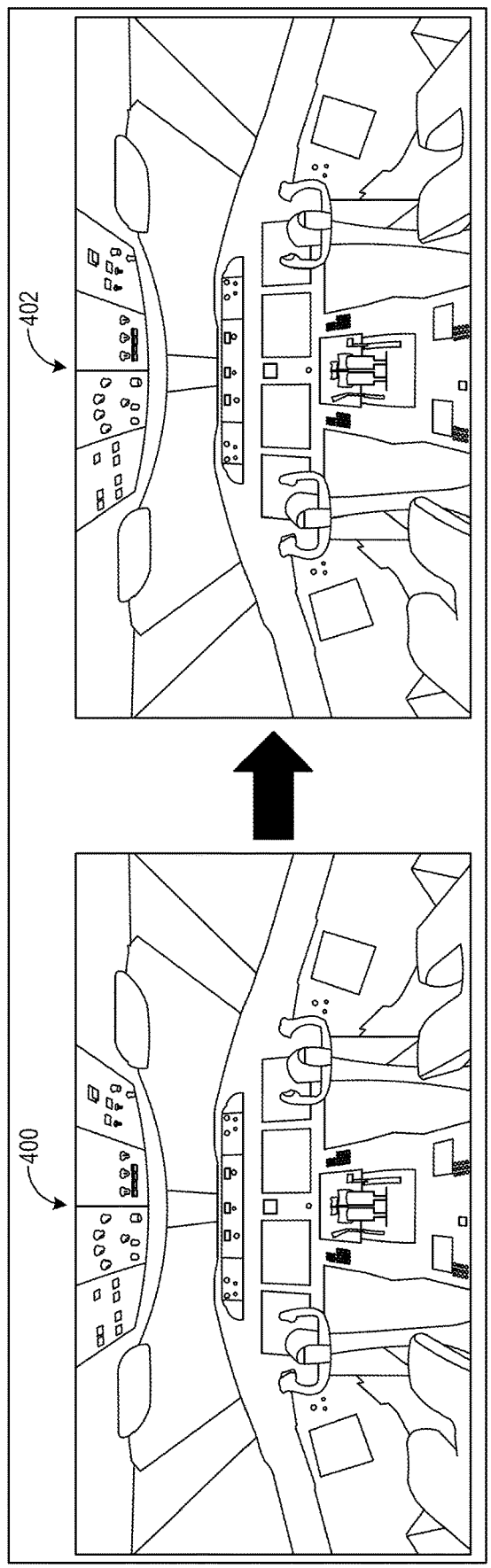
FIGS. 4A-4D show illustrations depicting example relationships between recording and simulation environments.

As noted above, a recording environment in which physical interaction is recorded, and a simulation environment in which the recording is played back, can exhibit various relationships. FIGS. 4A-4D illustrate example relationships that can exist between recording and simulation environments. FIG. 4A specifically illustrates examples in which a recording environment 400 and a simulation environment 402 both provide physical simulators having physical components that can be actuated by simulator users. In some such examples, recording environment 400 and simulation environment 402 can utilize the same physical simulator. This common physical simulator can be used in recording environment 400 while physical interactions with the physical simulator are recorded, and can be used in simulation environment 402 while recorded physical interactions are played back. In other examples, recording environment 400 and simulation environment 402 can provide respective, physically separated physical simulators—i.e., different physical simulators arranged in different locations. The physical simulators can correspond in any suitable manner, such as being of a common design, configured for a common aircraft model, and/or configured for a common aircraft type.

Figure 4B:
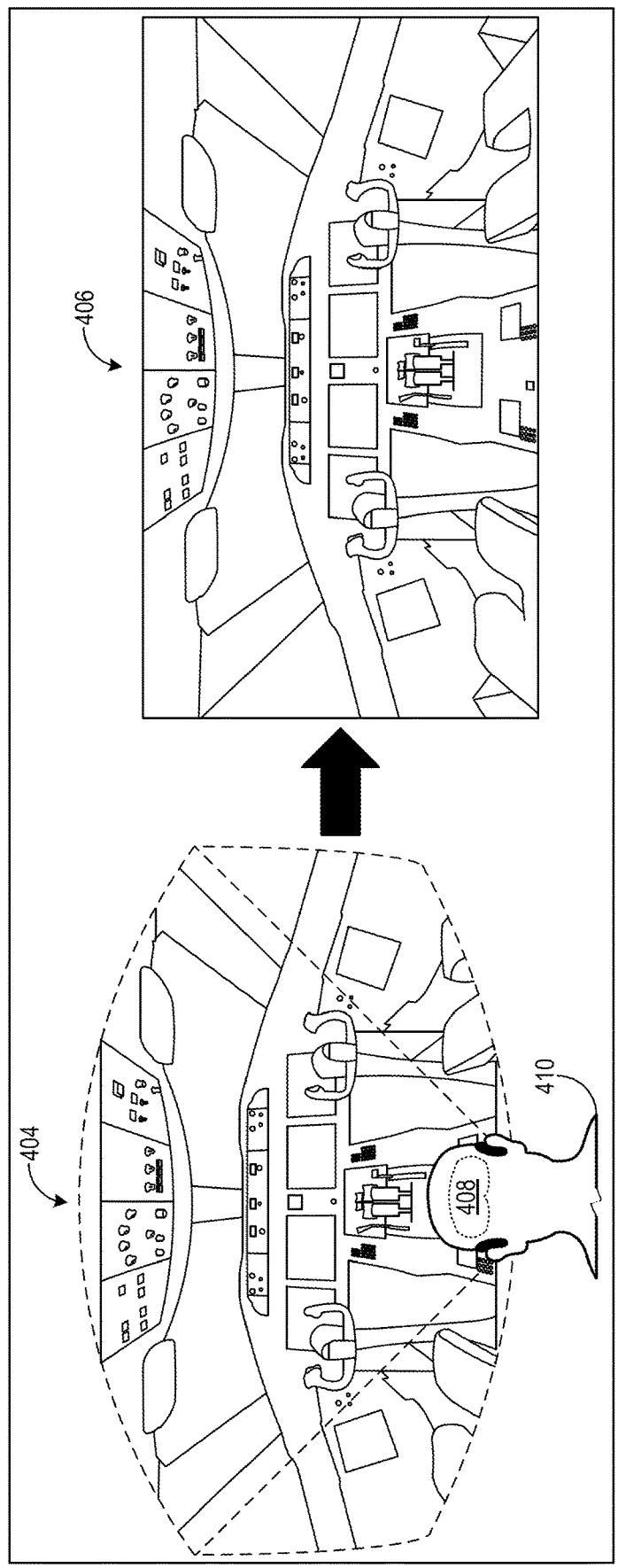

FIG. 4B illustrates examples in which a recording environment 404 provides an at least partially virtualized simulator, while a simulation environment 406 provides a physical simulator. In this example, recording environment 404 is presented via display output from a head-mounted display (HMD) device 408 worn by a user 410 in the recording environment 404. HMD device 408 can take any suitable form. In some examples, HMD device 408 is a virtual reality (VR) HMD device having a substantially opaque display that produces imagery representing a virtualized simulator. In other examples, HMD device 408 is an augmented reality (AR) HMD device having an at least partially transparent display that overlays or otherwise augments a view of the real, physical, surrounding environment with virtual imagery. So-called video-AR approaches are further possible in which a substantially opaque display produces a view of the surrounding physical environment via an image sensor, with the displayed view of the surrounding environment potentially being augmented with virtual imagery.

Where an at least partially virtualized simulator is provided—e.g., as in recording environment 404—physical components, partially virtualized physical components, and/or fully virtualized physical components can be provided. Physical components, for example, can include physical components that can be actuated and are not visually augmented. Partially virtualized physical components can include physical components that are visually augmented and/or visually simulated—for example, the appearance of a physical component can be augmented with virtual text and/or other imagery adjacent to and/or superimposed over the component. Fully virtualized physical components can include visual representations of physical components that are not physically actuated. Instead, the visual representations are displayed as being actuated upon detecting corresponding user interaction. "Physical interaction" as used herein can refer to user interaction with one or more of a physical component, a partially virtualized physical component, and/or a fully virtualized physical component. "Physical component" as used herein can refer to a fully physical component, a partially virtualized physical component, and/or a fully virtualized physical component.

Physical interactions in partially/wholly virtualized simulators such as in simulation environment 404 can be recorded in various manners. Where physical components are provided, actuation can be detected by sensors coupled to those physical components as described above. In other examples, such as those in which physical components are fully virtualized, physical interaction can be detected via motion data output by a handheld controller manipulated by user 410. For example, the handheld controller can employ a motion sensor (e.g., inertial measurement unit) to detect motion in one or more degrees of freedom—e.g., six degrees of freedom, including three degrees of translational freedom and three degrees of rotational freedom. In other examples, motion data can be collected from a wearable device worn by user 410, such as a glove having an on-board motion sensor. These and other potential input devices can report motion data that is associated with physical component(s) (e.g., physical, partially virtualized, or fully virtualized) such that the motion data can be used to play back an interaction with those physical components. In still other examples, an image sensing system (e.g., depth camera) can be used to image motion of user 408 and thus obtain motion data regarding movements by the user 408. As described below, motion data describing physical motion of a recorded user such as user 408 performed while carrying out physical interaction can be used to animate a virtual avatar, displayed in a simulation environment, to represent at least a portion of a human body performing the physical interaction.

Figure 4C:
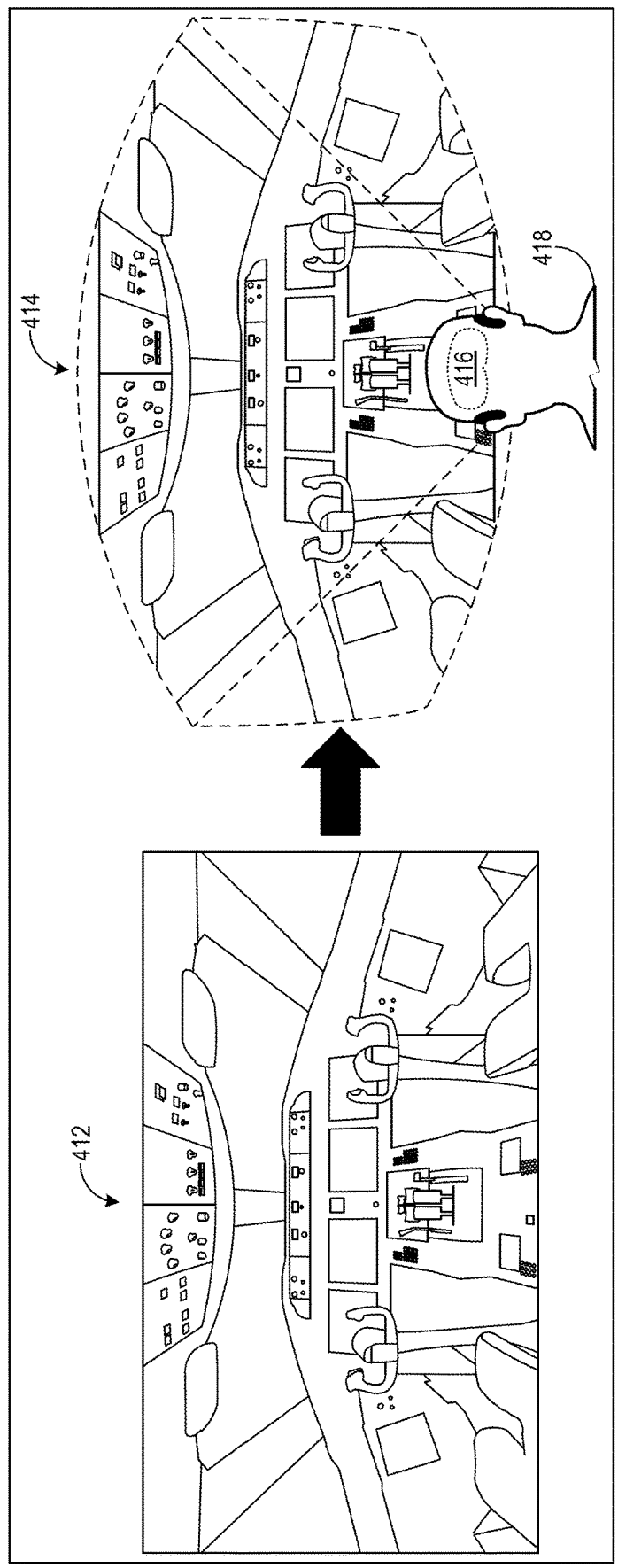

FIG. 4C illustrates examples in which a recording environment 412 provides a physical simulator, while a simulation environment 414 provides an at least partially virtualized simulator. Recording environment 412 is presented via display output from an HMD device 416 worn by a user 418 of the recording environment 412. HMD device 416 can be a VR or AR HMD, for example. Further, simulation environment 414 can provide one or more of physical components, partially virtualized physical components, and fully virtualized physical components. Interactions can be carried out by user 418, and detected from, a handheld controller, a tracked wearable device, external imaging of the user 418, and/or in any other suitable manner.

Physical components in simulation environment 414 that are at least partially virtualized can be modified by altering their appearance. As such, the configuration (e.g., appearance, layout, function) of simulation environment 414 can be modified based on the configuration of recording environment 412 (or other recording environment in which interactions are recorded, whether a physical or at least partially virtualized recording environment). The initialization of simulation environment 414 can thus include obtaining configuration data of recording environment 412, and configuring the simulation environment 414 based on the configuration data. In some examples, configuring simulation environment 414 can include establishing a layout, appearance, and/or function of at least partially virtualized physical components such that the simulation environment 414 substantially reproduces recording environment 412 (e.g., in appearance and function). In partially virtualized embodiments that provide an augmented or mixed reality environment, simulation environment 414—or, the virtualized portions—can be constructed by displaying, on HMD device 416, an augmented or mixed reality environment having one or more virtual surfaces that are positioned based on a physical configuration of recording environment 412. As a particular example, configuration data of recording environment 412 can be obtained by looking up an aircraft tail number, with simulation environment 414 being configured per the configuration data obtained using the tail number. The ability to dynamically configure simulation environment 414 based on the configuration of recording environment 412 can provide an adaptive simulator that enables training on a wide variety of aircraft types and models without requiring manual configuration of the simulator.

Configuring simulation environment 414 can include mapping physical component(s) that were interacted with in a recording made in recording environment 412 to corresponding physical component(s) in the simulation environment 414. This enables a recorded interaction with a physical component in recording environment 412 to be played back in relation to appropriate physical component(s) in simulation environment 414. This mapping process can be implemented in any suitable manner. In some examples, configuration data obtained for recording environment 412 can include mapping data specifying, for each physical component interacted with in the recording, a corresponding physical component in simulation environment 414 that should be mapped to. In other examples, mappings can be established via user input, for example as part of formulating a recording of physical interactions, or as part of configuring simulation environment 414 for playing back the recording. In yet other examples, a computing device can be used to programmatically map between recording and simulation environments 412 and 414. In this approach, physical components between recording and simulation environments 412 and 414 that correspond to one another can be identified on the basis of the function that the physical components perform—e.g., components that perform the same or like function.

Figure 4D:
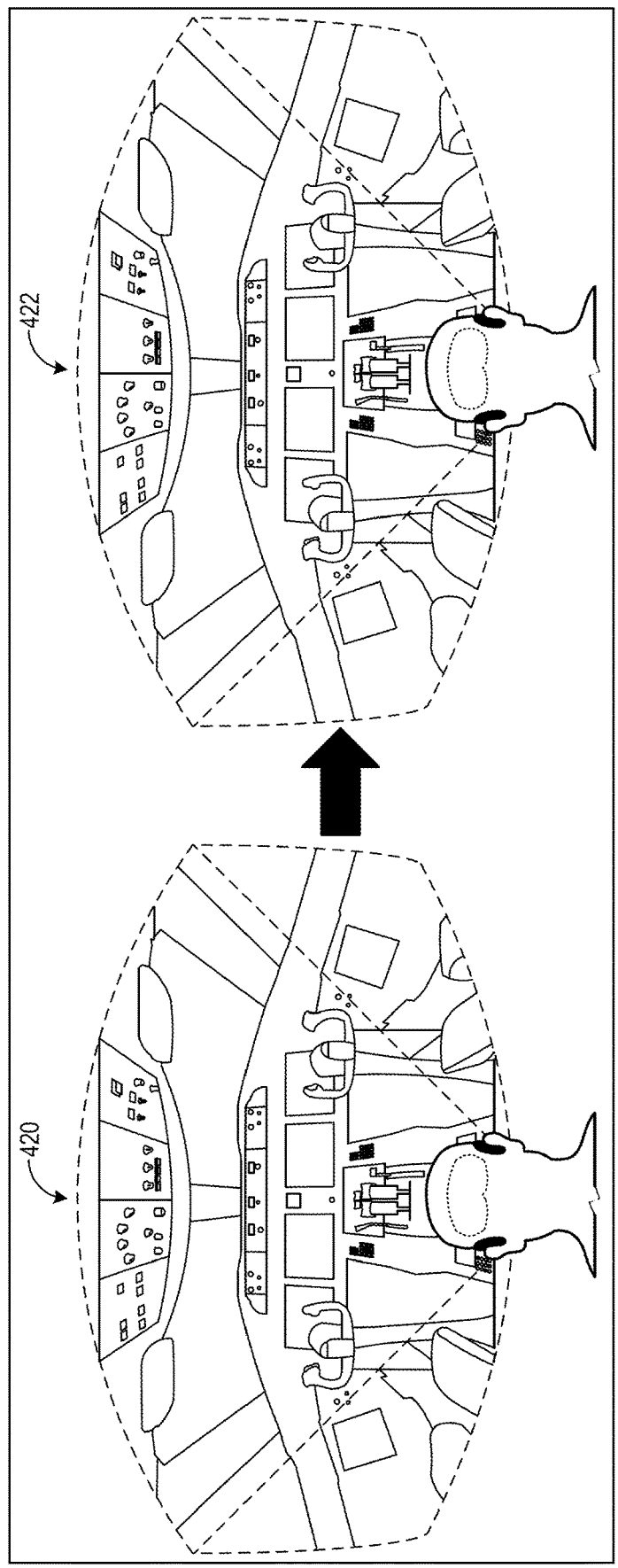

FIG. 4D illustrates examples in which a recording environment 420 provides an at least partially virtualized simulator, and a simulation environment 422 also provides an at least partially virtualized simulator. Each of environments 420 and 422 are presented via display output from a respective HMD device worn by a corresponding user. Each of environments 420 and 422 can provide one or more of physical components, partially virtualized physical components, and fully virtualized physical components. Interactions can be carried out by users, and detected from, a handheld controller, a tracked wearable device, external imaging of the users, and/or in any other suitable manner.

Figure 5:
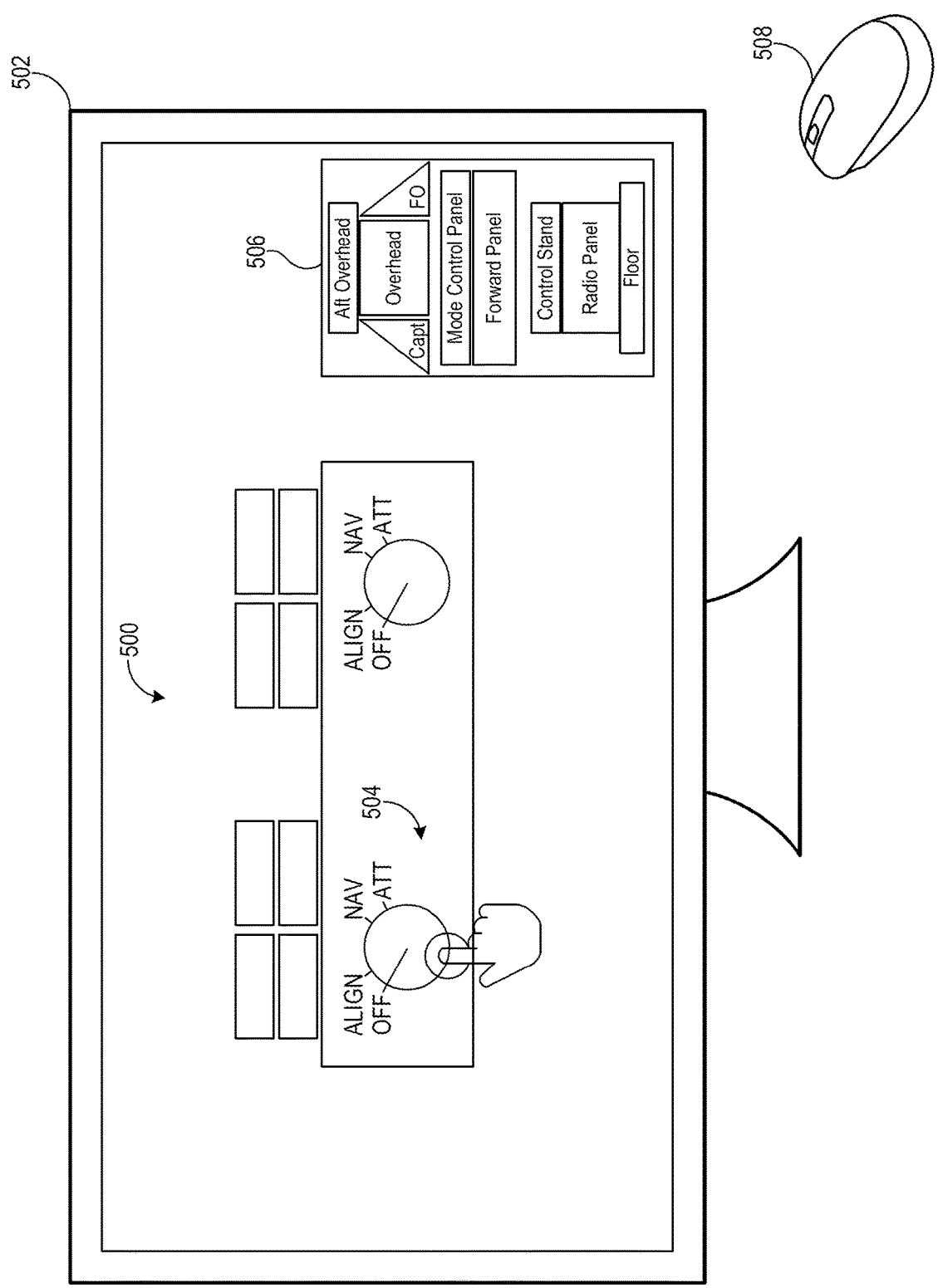
FIG. 5 shows an illustration depicting an example interaction paradigm for recording physical interactions and/or playing back physical interactions.

FIG. 5 Example Paradigm for Recording/Playbacking Physical Interactions

FIG. 5 depicts another example interaction paradigm for recording physical interactions and/or playing back physical interactions. In this example, a virtualized environment 500 is presented on a two-dimensional display 502 (e.g., monitor, television) including various virtualized components such as virtual rotary dial 504. A graphical user interface (GUI) 506 is further presented on display 502 with various controls selectable to vary the displayed location within the virtual simulator, such that a user can interact with different virtualized components within different regions of the virtualized aircraft.

In this example, interactions with virtualized components such as virtual dial 504 are performed via an input device 508, which is shown in the form of a mouse. Any suitable type of input device can be used to interact with virtualized components, however. Interactions with virtualized components carried out via input device 508 can be recorded and played back through the actuation of physical components in a simulation environment and/or the display of actuation on a display device. As examples, on or more kinematic properties of input provided via input device 508, including but not limited to translation, rotation, velocity, and acceleration can be recorded and applied in subsequent playback of the recording. The interaction paradigm illustrated in FIG. 5 can also be used to playback recordings and carry out user interaction. For example, a recorded physical interaction in which a physical dial is rotated by 30 degrees in a recording environment can be played back by displaying virtual dial 504 as rotating substantially 30 degrees on display 502. Other recorded physical interactions can be similarly played back via graphical output presented by display 502.

Figure 6:
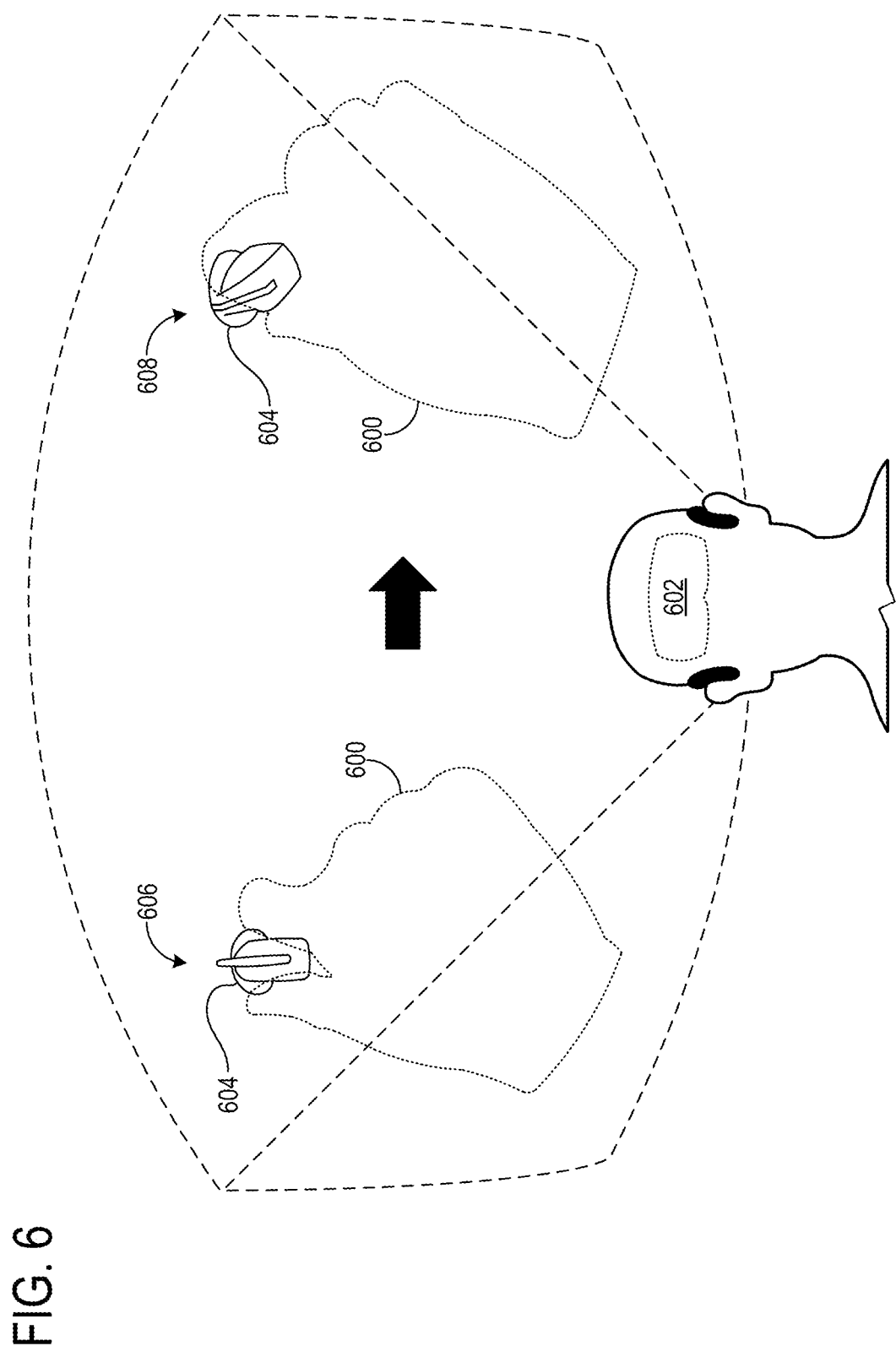
FIG. 6 shows an illustration depicting an example virtual avatar animated as performing a recorded physical interaction.

As described above, playback of recorded physical interaction can include the display of a virtual avatar. The virtual avatar can be animated to represent at least a portion of a human body performing recorded physical interaction. FIG. 6 depicts an example in which a virtual avatar 600, displayed via an HMD device 602, is animated as performing a recorded physical interaction in which a physical rotary dial 604 is rotated from an initial orientation 606 to a final orientation 608. In this example, the display of virtual avatar 600 includes displaying a virtual hand of the virtual avatar 600. In other examples, any other suitable portion(s) of a human user can be represented by virtual avatar 600, including but not limited to arm(s), leg(s), the torso, and/or head. In some examples, virtual avatar 600 can be animated using a skeletal mesh.

In some examples, virtual avatar 600 can be animated based on motion data describing physical motion of a recorded user performed while carrying out recorded physical interaction(s). In other words, the motion of a real human user, such as one recording physical interaction in a physical simulator such as that provided by simulation environment 100, can be sampled and used to animate virtual avatar 600. Motion data can be used in this manner for examples in which the recording environment, in which the motion data is collected, and the simulation environment, in which the motion data is used in playback, are physically corresponding environments. The recording and simulation environments can be physically corresponding environments for examples in which the two environments both provide physical simulators for a common type and/or model of aircraft, or when the simulation environment provides an at least partially virtualized simulator that can be constructed based on the physical configuration of the recording environment, as examples. Here, the physical correspondence of recording and simulation environment can enable the substantial reproduction of recorded human operator motion—through playback of related motion data—in the simulation environment, such that the reproduced motion, through display of virtual avatar 600, appears to realistically and correctly interact with components in the simulation environment. It will be understood that motion data representing motion of a real human operator can be collected in any suitable manner, including but not limited to using a handheld controller, wearable device, and/or external imaging as described above.

In other examples, virtual avatar 600 can be animated via means other than using motion data describing the physical motion of a recorded user. This approach can be utilized where recording and simulation environments are not physically corresponding environments—for example, where the simulation environment provides a physical simulator designed for a different type or model of aircraft than that for which the recording environment is configured. In such examples, the substantial reproduction of motion data collected in the recording environment may not result in accurate and realistic playback due to the differences in configuration between the recording and simulation environments. Virtual avatar 600 can also be animated via means other than using motion data for scenarios where motion data describing the motion of a human operator is not available, such as in examples where physical interactions are recorded in virtual display-space, as in the example depicted in FIG. 5, as opposed to real world-space.

One approach for animating virtual avatar 600 without motion data describing the physical motion of a recorded user utilizes an inverse kinematic solver to animate the virtual avatar 600. In this approach, the inverse kinematic solver can be used to programmatically compute animations for an interaction with which to animate virtual avatar 600 based on (1) one or more locations at which the interaction occurs, and/or (2) the type of interaction. For example, the inverse kinematic solver can animate an interaction based on the final location and/or orientation that the component is to be placed in, or based on both the initial location/orientation the component starts at and the final location/orientation. In some examples, the inverse kinematic solver can employ knowledge regarding human body mechanics—e.g., constraints on human movement—to inform animation generation. As a particular example, a skeletal model encoding information regarding the human body, and the possible relative movement among limbs, joints, and/or other parts, can be used to inform animation computation. Alternatively or additionally, motion data derived from the motion of real human operators can be sampled—e.g., in an environment that does not necessarily correspond to the environment in which a virtual avatar is displayed—for a variety of poses, positions, activities, procedures, etc. This motion data can be used, where relevant to the interaction being animated, to inform animation computation by the inverse kinematic solver.

The use of an inverse kinematic solver as described above can enable interactions to be animated using initial and/or final interaction locations, without motion data describing an actual performance of those interactions. As such, the inverse kinematic solver can be used to generate a wide variety of interaction animations, including by users that are not subject matter experts in the fields of rendering or animation—e.g., aircraft pilots. The use of an inverse kinematic solver can also address mismatches between the configuration of a recording environment and simulation environment, enabling recorded interactions to be represented in the simulation environment in a manner that is commensurate with how the interaction was performed in the recording environment, without the representation necessarily corresponding directly to the performance. Generally, the display of a virtual avatar such as virtual avatar 600 can provide a greater degree of informational content to a user, as the virtual avatar can not only demonstrate, in a realistic and human manner, how an interaction can be performed, but also indicate where an interaction is occurring, which can otherwise be challenging for users in simulators that provide a relatively complex layout and set of components.

Figure 7:
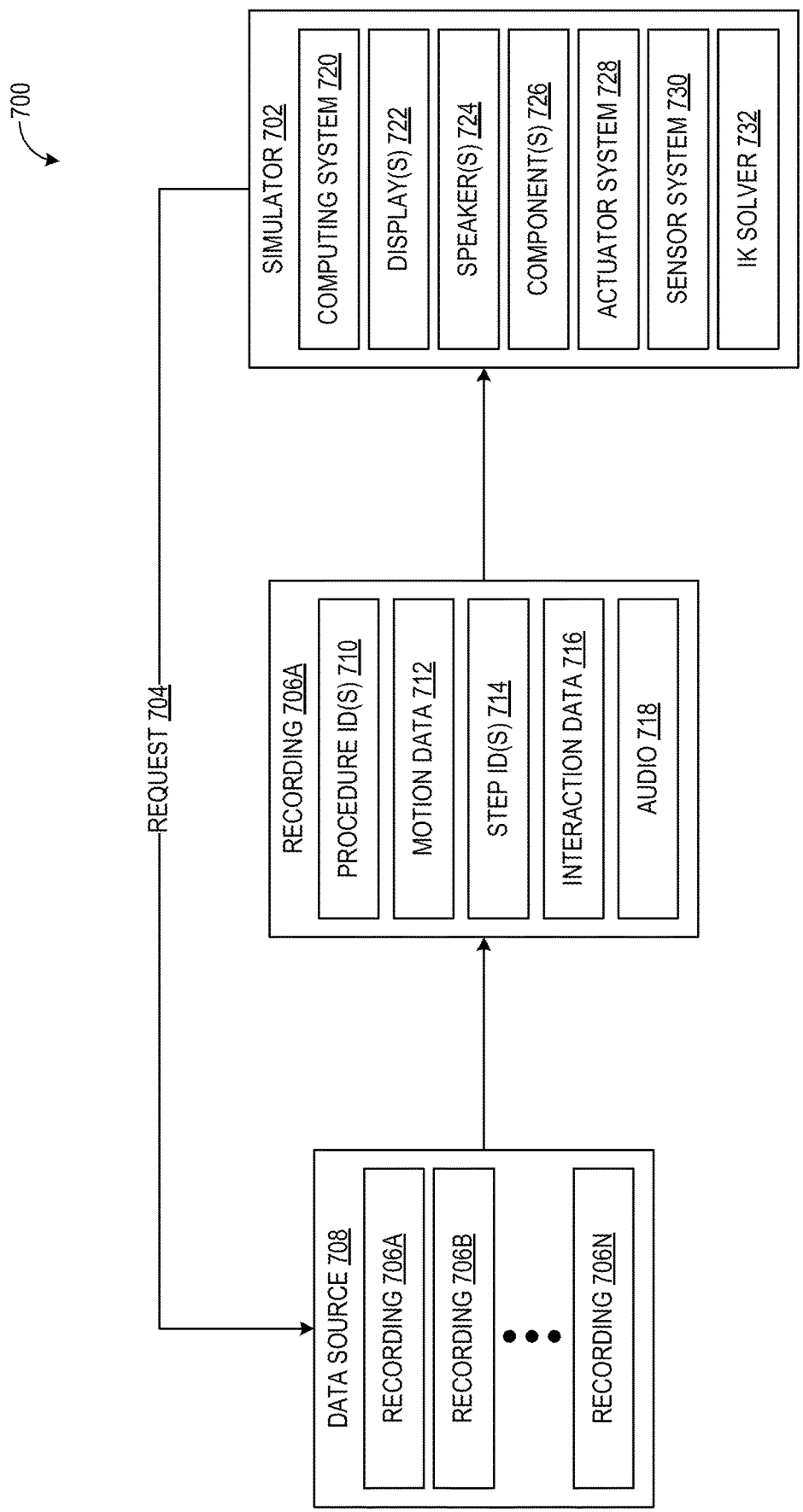
FIG. 7 shows an illustration depicting an example system in which recordings of physical interactions with physical component(s) can be obtained and played back in a simulator.

FIG. 7 schematically depicts an example system 700 in which recordings of physical interactions with physical component(s) can be obtained and played back in a simulator 702. Simulator 702 can be a simulator provided by one of environments 100, 402, 406, 414, 422, or 500, for example.

Simulator 702 can issue a request 704 for a given recording among a plurality of recordings 706 stored at a recording data source 708. Data source 708 can include a database, for example, or can take any other suitable form. Data source 708 can include a remote data source remote from simulator 702 an accessible by the simulator 702 via a network connection, for example. In some examples, a procedure ID can be associated with each recording 706 to enable the selection of recordings 706 according to procedure ID. This can enable the selection of recordings 706 for corresponding training procedures—e.g., procedures involved in different phases of flight such as aircraft takeoff, taxi, landing, etc. As shown in FIG. 7, the selected recording 706A includes an associated procedure ID 710.

Recording 706A can further include, in some examples, motion data 712 describing the physical motion of a recorded user performed while carrying out one or more physical interactions represented in the recording 706A. As one example, motion data 712 can include a series of time-stamped three-dimensional (e.g., x/y/z) data points describing the position and/or rotation of one or more parts of the recorded user, such as the hand(s) and/or head. The data points can be labeled with a procedure step ID 714 to denote a series of data that define individual actions, and procedure ID(s) 710 to denote series of individual actions that define a procedure. The data points can also be labelled with input commands associated with the action defined by the data points (e.g., "grab", "look at"). Steps identified in recording 706A can include descriptions of input commands (e.g., switch state changes, button presses, visual verification) that result in successful step completion. Further, steps can also include an operator label, indicating the role of the operator performing the action (e.g., captain, first officer), as well as the agent performing each action (e.g., human, virtual avatar).

Recording 706A can further include interaction data 716, which can describe interactions by type, kinematic data associated with interactions, and/or any other suitable information related to recorded interactions. Where recording 706A is derived from interaction with a virtualized simulator presented on a two-dimensional display using a mouse, interaction data 716 can include the location and/or timing of mouse clicks, and the components to which the clicks were directed, for example. Recording 706A can still further include audio 718, which can include speech recorded by user(s) that created the recording 706A, for example.

It will be understood that recordings 706 can be edited or otherwise processed before storage in data source 708 and/or before being obtained for playback in simulator 702. An editor application configured to enable users to edit recordings 706 can provided to this end, for example. The processing of a recording 706 can include discarding erroneous frames, such as those in which aberrant motion occurs. The processing of a recording 706 can further include discarding frames in the recording 706 to reduce the framerate of the recording 706. For example, the recording 706 can be recorded at an initial framerate (e.g., 60 fps) and processed to a final, lesser framerate (e.g., 30 fps) for storage at data source 708. Recording 706 can be played back in simulator 702 at the final framerate while still producing relatively continuous motion, or can be interpolated at the simulator 702 for playback at a higher framerate than the final framerate, such as the initial framerate. This approach can reduce the size of recordings 706 at data source 708. Other processing of a recording 706 can include reducing data corresponding to movements below a threshold level or rate. This can avoid small, noisy, and unnecessary movements being played back, for example. Generally, recordings 706 can be organized at data source 708 based on procedure, training length, input device type, complexity, interaction type, and/or any other suitable criteria.

Upon selection, recording 706A can be provided to simulator 702 for playback therein. Simulator 702 can include a computing system 720 configured to playback recordings 706, control components in the simulator 702, and generally facilitate simulator operation and recording playback. Simulator 702 can include one or more displays 722, such as display(s) that generate imagery representing a virtualized surrounding environment. Simulator 702 can include one or more speakers 724, which can output audio such as speech included in recording 706A. Simulator 702 can include one or more physical components 726 (e.g., yokes, switches, dials, pedals, throttles). Physical component(s) 726 can include fully physical components, partially virtualized components, and/or fully virtualized components. Simulator 702 can include an actuator system 728 comprising one or more actuators configured to actuate physical component(s) 726. Simulator 702 can include a sensor system 730 comprising one or more sensors configured to sense actuation of physical component(s) 726 (e.g., to sense kinematic properties of actuation). Simulator 702 can include an inverse kinematic (IK) solver 732 configured to compute animations for a virtual avatar, which can be displayed via display(s) 722.

As described above, recordings 706 can include one or more procedures that each include one or more steps. In such examples, playback of a recording 706 can include detecting a user interaction, such as at a given step in a procedure included in the recording 706, with one or more physical components. The user interaction and/or physical component(s) can be identified by a corresponding step ID, for example. It then can be determined—e.g., by computing system 720 using output from sensor system 730—whether the user interaction is congruent with at least one corresponding physical interaction associated with the given step. For example, kinematic properties, timing information, physical component(s) interacted with, and/or any other suitable criteria can be compared between the user interaction and corresponding information in the recording 706 to determine such congruence. Where the user interaction is deemed congruent with the recorded physical interaction(s), playback of recording 706 can be continued, with congruence determinations potentially being made for each step of each procedure. If instead it is determined that the user action is not congruent with the at least one corresponding physical interaction, a virtual avatar (e.g., virtual avatar 600) can be displayed as performing an interaction that is congruent with the at least one corresponding physical interaction. This can enhance training, as tactile, proprioceptive feedback can be rapidly provided to a user of simulator 702 through display of the virtual avatar as correcting the incorrect performance by the user.

In some examples, a virtual avatar can be displayed as performing a physical interactions in cooperation with a user interaction, with the one or more physical components, carried out by a human operator. In such examples, one or more virtual avatars can be configured to cooperate with a user of simulator 702 to achieve a procedure, such as a procedure involving multi-user crews. As one example, the user can complete one or more steps or actions, and upon successful completion of those step(s)/action(s), a virtual avatar can be animated to complete one or more subsequent steps or actions.

In some examples, different outcomes or paths can be made available upon completion by a user of simulator 702 of a step or action. In other words, event-driven outcomes contingent upon user action are possible. Further, probabilistic rules can be established to select among different outcomes or among different behaviors of physical components. These and other event-driven aspects can be specified using an editor application as described above, for example.

As noted above, physical interactions can include interactions with physical components, partially virtualized components, and/or fully virtualized components. A physical interaction can occur with a virtual component presented on a physical display, for example, as the physical interaction occurs with the physical display. Similarly, a physical interaction can occur with a virtual component presented on an HMD device, for example, as the physical interaction occurs with the HMD device. Detecting physical interactions thus can include detecting physical actuation of a physical component, and/or actuation of an at least partially virtualized component, for example.

Figure 8:
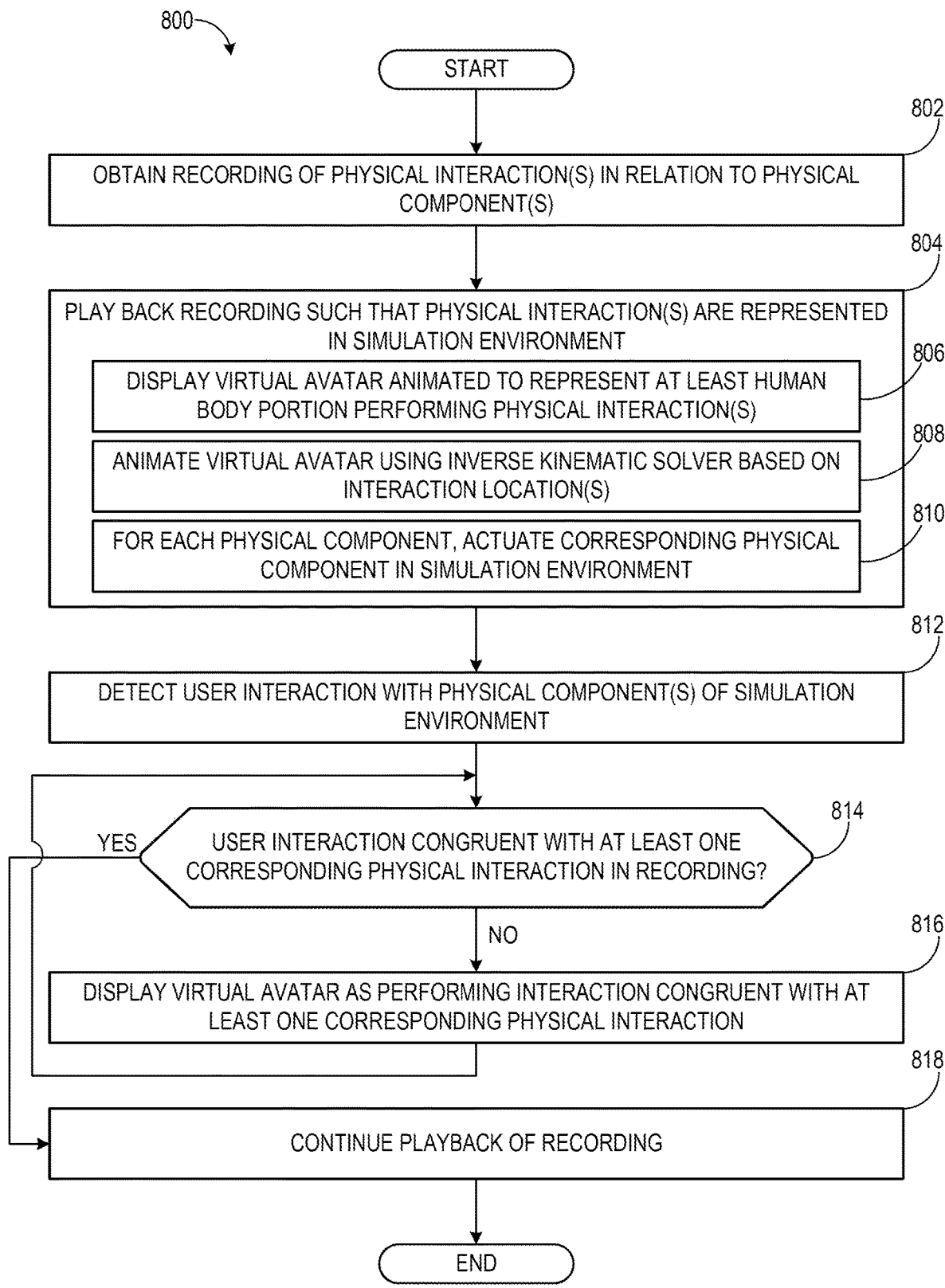
FIG. 8 shows an illustration of operations of a method performed according to an example embodiment of the present disclosure.

FIG. 8 depicts a flowchart illustrating an example method 800. Method 800 can be implemented in one or more of environments 100, 402, 406, 414, 422, and 500, for example.

At 802, method 800 includes obtaining a recording of one or more physical interactions performed in relation to one or more physical components. At 804, method 800 includes, in a simulation environment, playing back the recording such that the one or more physical interactions are represented in the simulation environment. Playback can include displaying 806, on a display device, a virtual avatar that is animated to represent at least a portion of a human body performing the one or more physical interactions. Animating the virtual avatar can include using 808 an inverse kinematic solver based at least on one or more locations at which the one or more physical interactions occur. Playback can include, for each physical component, actuating 810 a corresponding physical component in the simulation environment.

At 812, method 800 includes, in the simulation environment, detecting a user interaction with one or more physical components of the simulation environment. At 814, method 800 includes determining whether the user interaction is congruent with at least one corresponding physical interaction of the one or more physical interactions in the recording. If it is determined that the user interaction is not congruent (NO), method 800 proceeds to 816. At 816, method 800 includes displaying the virtual avatar as performing an interaction that is congruent with the at least one corresponding physical interaction. Following 816, method 800 returns to 814. In some examples, the evaluation of congruence at 814 and display of the corrective virtual avatar at 816 can be repeated until the user interaction is determined to be congruent.

If it is determined at 814 that the user interaction is congruent (YES), method 800 proceeds to 818. At 818, method 800 includes, in response to such congruence, continuing playback of the recording in the simulation environment. It will be understood that, in some examples, at least a portion method 800 can be iteratively performed—e.g., for each of a plurality of steps and/or procedures in the recording. Referring back again to a determination that the user interaction is not congruent (NO at step 814), optionally no intervention may be employed and continuation of the recording may proceed at step 818. Still further, when the user action is found to not be congruent, a prompt (audio or visual may be employed) indicating the noncongruence, and for example, providing a instruction on the correct interaction.

In some examples, an additional system can be employed to log and store user interactions in the simulation environment, such as those determined at step 814. This can be used to allow the user interactions to be analyzed to provide feedback to the student on the congruence of their actions after the completion of the session. Such a system can be implemented in connection with one or more of the components of computing system 900 (FIG. 9).

In some embodiments, the methods and processes described herein can be tied to a computing system of one or more computing devices. In particular, such methods and processes can be implemented as a computer-application program or service, an application-programming interface (API), a library, and/or other computer-program product.

Figure 9:
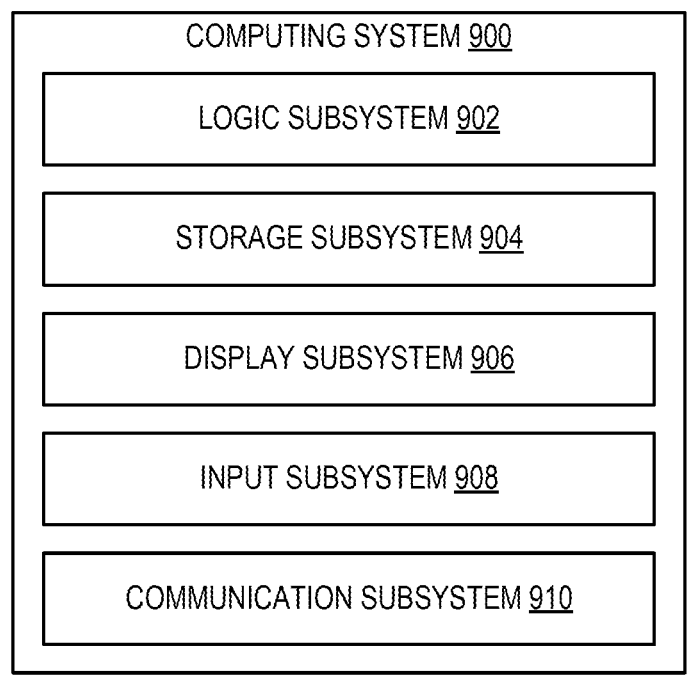
FIG. 9 shows an illustration of an example computing system.

FIG. 9 schematically shows a non-limiting embodiment of a computing system 900 that can enact one or more of the methods and processes described above. Computing system 900 is shown in simplified form. Computing system 900 can take the form of one or more personal computers, server computers, tablet computers, home-entertainment computers, network computing devices, gaming devices, mobile computing devices, mobile communication devices (e.g., smart phone), and/or other computing devices.

Computing system 900 includes a logic subsystem 902 and a storage subsystem 904. Computing system 900 can optionally include a display subsystem 906, input subsystem 908, communication subsystem 910, and/or other components not shown in FIG. 9.

Logic subsystem 902 includes one or more physical devices configured to execute instructions. For example, the logic subsystem can be configured to execute instructions that are part of one or more applications, services, programs, routines, libraries, objects, components, data structures, or other logical constructs. Such instructions can be implemented to perform a task, implement a data type, transform the state of one or more components, achieve a technical effect, or otherwise arrive at a desired result.

The logic subsystem can include one or more processors configured to execute software instructions. Additionally or alternatively, the logic subsystem can include one or more hardware or firmware logic subsystems configured to execute hardware or firmware instructions. Processors of the logic subsystem can be single-core or multi-core, and the instructions executed thereon can be configured for sequential, parallel, and/or distributed processing. Individual components of the logic subsystem optionally can be distributed among two or more separate devices, which can be remotely located and/or configured for coordinated processing. Aspects of the logic subsystem can be virtualized and executed by remotely accessible, networked computing devices configured in a cloud-computing configuration.

Storage subsystem 904 includes one or more physical devices configured to hold instructions executable by the logic subsystem to implement the methods and processes described herein. When such methods and processes are implemented, the state of storage subsystem 904 can be transformed—e.g., to hold different data.

Storage subsystem 904 can include removable and/or built-in devices. Storage subsystem 904 can include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 904 can include volatile, nonvolatile, dynamic, static, read/write, read-only, random-access, sequential-access, location-addressable, file-addressable, and/or content-addressable devices.

It will be appreciated that storage subsystem 904 includes one or more physical devices. However, aspects of the instructions described herein alternatively can be propagated by a communication medium (e.g., an electromagnetic signal, an optical signal, etc.) that is not held by a physical device for a finite duration.

Aspects of logic subsystem 902 and storage subsystem 904 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" can be used to describe an aspect of computing system 900 implemented to perform a particular function. In some cases, a module, program, or engine can be instantiated via logic subsystem 902 executing instructions held by storage subsystem 904. It will be understood that different modules, programs, and/or engines can be instantiated from the same application, service, code block, object, library, routine, API, function, etc. Likewise, the same module, program, and/or engine can be instantiated by different applications, services, code blocks, objects, routines, APIs, functions, etc. The terms "module," "program," and "engine" can encompass individual or groups of executable files, data files, libraries, drivers, scripts, database records, etc.

It will be appreciated that a "service", as used herein, is an application program executable across multiple user sessions. A service can be available to one or more system components, programs, and/or other services. In some implementations, a service can run on one or more server-computing devices.

When included, display subsystem 906 can be used to present a visual representation of data held by storage subsystem 904. This visual representation can take the form of a graphical user interface (GUI). As the herein described methods and processes change the data held by the storage subsystem, and thus transform the state of the storage subsystem, the state of display subsystem 906 can likewise be transformed to visually represent changes in the underlying data. Display subsystem 906 can include one or more display devices utilizing virtually any type of technology. Such display devices can be combined with logic subsystem 902 and/or storage subsystem 904 in a shared enclosure, or such display devices can be peripheral display devices.

When included, input subsystem 908 can comprise or interface with one or more user-input devices such as a keyboard, mouse, touch screen, or game controller. In some embodiments, the input subsystem can comprise or interface with selected natural user input (NUI) componentry. Such componentry can be integrated or peripheral, and the transduction and/or processing of input actions can be handled on- or off-board. Example NUI componentry can include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 can be configured to communicatively couple computing system 900 with one or more other computing devices. Communication subsystem 910 can include wired and/or wireless communication devices compatible with one or more different communication protocols. As non-limiting examples, the communication subsystem can be configured for communication via a wireless telephone network, or a wired or wireless local- or wide-area network. In some embodiments, the communication subsystem can allow computing system 900 to send and/or receive messages to and/or from other devices via a network such as the Internet.

In an example, a method is provided, including (1) obtaining a recording of one or more physical interactions performed in relation to one or more physical components; (2) in a simulation environment, playing back the recording such that the one or more physical interactions are represented in the simulation environment; (3) in the simulation environment, detecting a user interaction with one or more physical components of the simulation environment; (4) determining whether the user interaction is congruent with at least one corresponding physical interaction of the one or more physical interactions in the recording; and (5) in response to such congruence, continuing playback of the recording in the simulation environment. In this and other examples, playing back the recording may include displaying, on a display device, a virtual avatar that is animated to represent at least a portion of a human body performing the one or more physical interactions. In this and other examples, the recording may be recorded in a recording environment and the method may further include, (1) where the recording environment and the simulator environment are physically corresponding environments, animating the virtual avatar using motion data describing physical motion of a recorded user performed in the one or more physical interactions; and (2) where the recording environment and the simulator environment are not physically corresponding environments, animating the virtual avatar without the motion data and using an inverse kinematic solver. In this example and other examples, the method may further include, in response to determining that the user action is not congruent with the at least one corresponding physical interaction, displaying the virtual avatar as performing an interaction that is congruent with the at least one corresponding physical interaction. In this and other examples, the virtual avatar, may be animated using an inverse kinematic solver based at least on one or more locations at which the one or more physical interactions occur. In this and other examples, playing back the recording may further include, for each of the one or more physical components, actuating a corresponding physical component in the simulation environment. In this and other examples, the one or more physical components may include one or more of a yoke, switch, rotary, pedal, and throttle. In this and other examples, the method may further include displaying, on a display device, a virtual avatar as performing at least one of the one or more physical interactions in cooperation with the user interaction with the one or more physical components. In this and other examples, detecting the user interaction with the one or more physical components may include detecting physical actuation of the one or more physical components. In this and other examples, the user interaction with the one or more physical components may be detected based on sensor data output from an input device manipulated in performing the user interaction. In this and other examples, the recording may be recorded in a recording environment different from the simulation environment, further comprising mapping each of the one or more physical components in the recording environment to a corresponding physical component in the simulation environment. In this and other examples, the method may further include constructing the simulation environment by at least displaying, on a display device, a mixed reality environment comprising one or more virtual surfaces that are positioned based on a physical configuration of recording environment in which the recording is recorded.

In another example, a computing system is provided, including a logic subsystem and a storage subsystem comprising instructions executable by the logic subsystem to: (1) obtain a recording of one or more physical interactions performed in relation to one or more physical components; (2) in a simulation environment, play back the recording such that the one or more physical interactions are represented in the simulation environment; (3) in the simulation environment, detect a user interaction with one or more physical components of the simulation environment; (4) determine whether the user interaction is congruent with at least one corresponding physical interaction of the one or more physical interactions in the recording; and (5) in response to such congruence, continue playback of the recording in the simulation environment. In this and other examples, the instructions executable to play back the recording may include instructions executable to display, on a display device, a virtual avatar that is animated to represent at least a portion of a human body performing the one or more physical interactions. In this and other examples, the virtual avatar may be animated using an inverse kinematic solver based at least on one or more locations at which the one or more physical interactions occur. In this and other examples, the instructions executable to play back the recording may include instructions executable to, for each of the one or more physical components, actuate a corresponding physical component in the simulation environment. In this and other examples, the system may further include instructions executable to, in response to determining that the user action is not congruent with the at least one corresponding physical interaction, display the virtual avatar as performing an interaction that is congruent with the at least one corresponding physical interaction.

In yet another example, a method is provided including (1) obtaining a recording of one or more physical interactions performed in a recording environment in relation to one or more physical components; (2) mapping the recording environment to a simulation environment in which the recording is to be played back; (3) in the simulation environment, playing back the recording such that the one or more physical interactions are represented in the simulation environment through one or both of (a) displaying a virtual avatar that is animated to represent at least a portion of a human body performing the one or more physical interactions, and (b) for each of the one or more physical components, actuating a corresponding physical component in the simulation environment; (4) in the simulation environment, detecting a user interaction with one or more physical components of the simulation environment; (5) determining whether the user interaction is congruent with at least one corresponding physical interaction of the one or more physical interactions in the recording; and (6) in response to such congruence, continuing playback of the recording in the simulation environment. In this and other examples, the virtual avatar may be animated using an inverse kinematic solver based at least on one or more locations at which the one or more physical interactions occur.

To the extent that terms "includes," "including," "has," "contains," and variants thereof are used herein, such terms are intended to be inclusive in a manner similar to the term "comprises" as an open transition word without precluding any additional or other elements.

The present disclosure includes all novel and non-obvious combinations and subcombinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

The invention claimed is:

1. A method, comprising:
   obtaining a recording of one or more physical interactions performed in relation to one or more physical components in a recording environment;
   in a simulation environment, playing back the recording such that the one or more physical interactions are represented in the simulation environment by displaying, on a display device, a virtual avatar that is animated to represent at least a portion of a human body performing the one or more physical interactions in relation to one or more simulated components of the simulation environment, wherein the virtual avatar is animated at a display framerate that is higher than a stored framerate of the recording, wherein the recording environment and the simulation environment correspond to different aircraft types, and wherein the virtual avatar is animated using an inverse kinematic solver;
   in the simulation environment, detecting a user interaction with one or more physical components of the simulation environment;

determining whether the user interaction is congruent with at least one corresponding physical interaction of the one or more physical interactions in the recording; and in response to such congruence, continuing playback of the recording in the simulation environment.

2. The method of claim 1, further comprising, in response to determining that the user interaction is not congruent with the at least one corresponding physical interaction, displaying the virtual avatar as performing an interaction that is congruent with the at least one corresponding physical interaction.

3. The method of claim 1, where the recording comprises motion data describing physical motion of a recorded user performed while carrying out the one or more physical interactions, and where the virtual avatar is animated based on the motion data.

4. The method of claim 1, where the virtual avatar is animated using the inverse kinematic solver based at least on one or more locations at which the one or more physical interactions occur.

5. The method of claim 1, where playing back the recording comprises, for each of the one or more physical components, actuating a corresponding physical component in the simulation environment.

6. The method of claim 1, where the one or more physical components comprise one or more of a yoke, switch, rotary, pedal, and throttle.

7. The method of claim 1, further comprising displaying, on the display device, the virtual avatar as performing at least one of the one or more physical interactions in cooperation with the user interaction with the one or more physical components.

8. The method of claim 1, where detecting the user interaction with the one or more physical components comprises detecting physical actuation of the one or more physical components.

9. The method of claim 1, where the user interaction with the one or more physical components is detected based on sensor data output from an input device manipulated in performing the user interaction.

10. The method of claim 1, further comprising mapping each of the one or more physical components in the recording environment to a corresponding physical component in the simulation environment.

11. The method of claim 1, further comprising constructing the simulation environment by at least displaying, on the display device, a mixed reality environment comprising one or more virtual surfaces that are positioned based on a physical configuration of the recording environment in which the recording is recorded.

12. A computing system, comprising:
a logic subsystem; and
a storage subsystem comprising instructions executable by the logic subsystem to:
obtain a recording of one or more physical interactions performed in relation to one or more physical components in a recording environment;
in a simulation environment, play back the recording such that the one or more physical interactions are represented in the simulation environment by displaying, on a display device, a virtual avatar that is animated to represent at least a portion of a human body performing the one or more physical interactions in relation to one or more simulated components of the simulation environment, wherein the virtual avatar is animated at a display framerate that is higher than a stored framerate of the recording, wherein the recording environment and the simulation environment correspond to different aircraft types, and wherein the virtual avatar is animated using an inverse kinematic solver;
in the simulation environment, detect a user interaction with one or more physical components of the simulation environment;
determine whether the user interaction is congruent with at least one corresponding physical interaction of the one or more physical interactions in the recording; and
in response to such congruence, continue playback of the recording in the simulation environment.

13. The computing system of claim 12, where the virtual avatar is animated using the inverse kinematic solver based at least on one or more locations at which the one or more physical interactions occur.

14. The computing system of claim 12, where the instructions executable to play back the recording comprise instructions executable to, for each of the one or more physical components, actuate a corresponding physical component in the simulation environment.

15. The computing system of claim 12, further comprising instructions executable to, in response to determining that the user action is not congruent with the at least one corresponding physical interaction, display the virtual avatar as performing an interaction that is congruent with the at least one corresponding physical interaction.

16. A method, comprising:
obtaining a recording of one or more physical interactions performed in a recording environment in relation to one or more physical components;
mapping the recording environment to a simulation environment in which the recording is to be played back;
in the simulation environment, playing back the recording such that the one or more physical interactions are represented in the simulation environment by (1) displaying a virtual avatar that is animated to represent at least a portion of a human body performing the one or more physical interactions in relation to one or more simulated components of the simulation environment, wherein the virtual avatar is animated at a display framerate that is higher than a stored framerate of the recording, wherein the recording environment and the simulation environment correspond to different aircraft types, and wherein the virtual avatar is animated using an inverse kinematic solver, and (2) for each of the one or more physical components, actuating a corresponding physical component in the simulation environment;
in the simulation environment, detecting a user interaction with one or more physical components of the simulation environment;
determining whether the user interaction is congruent with at least one corresponding physical interaction of the one or more physical interactions in the recording; and
in response to such congruence, continuing playback of the recording in the simulation environment.

17. The method of claim 16, where the virtual avatar is animated using the inverse kinematic solver based at least on one or more locations at which the one or more physical interactions occur.

18. The method of claim 1, wherein a layout of the one or more simulated components of the simulation environment differs from a layout of the one or more physical components in the recording environment.

19. The computing system of claim 12, wherein the display framerate is interpolated from the stored framerate.

20. The method of claim 16, wherein the display framerate is interpolated from the stored framerate.

* * * * *